United States Patent
Cao et al.

(10) Patent No.: US 10,833,303 B2
(45) Date of Patent: Nov. 10, 2020

(54) COMPOSITE END PLATE AND BATTERY MODULE

(71) Applicant: Contemporary Amperex Technology Co., Limited, Ningde (CN)

(72) Inventors: Gen Cao, Ningde (CN); Jihua Yao, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/355,634

(22) Filed: Mar. 15, 2019

(65) Prior Publication Data
US 2019/0305271 A1  Oct. 3, 2019

(30) Foreign Application Priority Data

Mar. 29, 2018  (CN) .......................... 2018 1 0271631

(51) Int. Cl.
*H01M 2/10* (2006.01)
*H01M 2/12* (2006.01)
*H01M 10/04* (2006.01)

(52) U.S. Cl.
CPC ....... *H01M 2/1077* (2013.01); *H01M 2/1061* (2013.01); *H01M 2/12* (2013.01); *H01M 10/0481* (2013.01)

(58) Field of Classification Search
CPC .... H01M 2/1077; H01M 2/1061; H01M 2/10; H01M 10/0481; H01M 2220/20
See application file for complete search history.

(56) References Cited

U.S. PATENT DOCUMENTS

| 2013/0273404 A1 | 10/2013 | Ochi et al. |
| 2015/0135522 A1* | 5/2015 | Seto ................... H01M 2/1022 29/623.2 |

(Continued)

FOREIGN PATENT DOCUMENTS

| CN | 1992385 A | 7/2007 |
| CN | 102110799 B | 2/2015 |

(Continued)

OTHER PUBLICATIONS

The partial European Search Report for European Application No. 19164147.1, dated Jun. 13, 2019, 15 pages.

(Continued)

*Primary Examiner* — Stephen J Yanchuk
(74) *Attorney, Agent, or Firm* — Law Office of Liaoteng Wang

(57) ABSTRACT

The disclosure relates to a composite end plate and a battery module. The composite end plate comprises: a base plate comprising a first surface and a second surface disposed opposite to each other, wherein the base plate is arranged such that the first surface faces a battery; and a rigid insert, wherein the rigid insert and the base plate are made of different materials, the rigid insert is made of metal material, the rigid insert is arranged at a bottom portion of the base plate, and at least a part of the rigid insert is arranged at the second surface and extends in a length direction of the second surface. According to embodiments of the disclosure, the composite end plate comprises the base plate and the rigid insert made of different materials.

14 Claims, 7 Drawing Sheets

(56) References Cited

U.S. PATENT DOCUMENTS

| | | | | |
|---|---|---|---|---|
| 2015/0140408 A1* | 5/2015 | Hayashida | ......... | H01M 2/1061 |
| | | | | 429/159 |
| 2015/0303509 A1 | 10/2015 | Tajima | | |
| 2016/0036029 A1* | 2/2016 | Tononishi | ......... | H01M 2/0237 |
| | | | | 429/121 |
| 2016/0218332 A1* | 7/2016 | Baek | ................. | H01M 2/1083 |
| 2018/0151908 A1* | 5/2018 | An | ..................... | H01M 2/1077 |

FOREIGN PATENT DOCUMENTS

| | | | |
|---|---|---|---|
| CN | 205790141 U | | 12/2016 |
| CN | 106654103 A | | 5/2017 |
| CN | 106711366 A | | 5/2017 |
| CN | 206727139 U | | 12/2017 |
| CN | 106654103 B | | 10/2019 |
| EP | 2874201 | * | 11/2014 |
| EP | 2874201 A1 | | 5/2015 |
| EP | 3168899 A1 | | 5/2017 |
| KR | 20170053429 A | | 5/2017 |

OTHER PUBLICATIONS

The First office action for Chinese Application No. 201810271631.5, dated Aug. 10, 2020, 7 pages.

* cited by examiner

COMPOSITE END PLATE AND BATTERY MODULE

CROSS-REFERENCE TO RELATED APPLICATION

This application is based on and claims priority to Chinese Patent Application No. 201810271631.5 filed on Mar. 29, 2018, which is incorporated herein by reference in its entirety.

FIELD

The present disclosure relates to the technical field of battery, and in particular to a composite end plate and a battery module.

BACKGROUND

With continuous developments of technologies, power batteries are applied to more and more areas involving production and life. The power battery, also known as secondary battery, is a rechargeable battery. The power batteries are widely used. The power batteries with a low capacity may be applied to small electric vehicles, and the power batteries with a high capacity may be applied to large electric vehicles, such as hybrid electric vehicles or electric cars. When the power batteries were used in groups, a busbar is needed to connect each of the power batteries in series or in parallel. Usually, the busbar is welded to a positive electrode and a negative electrode of the power battery. Each power battery comprises a plurality of battery modules. Each battery module comprises a plurality of batteries, end plates and side plates for fixing the batteries. The end plates and the side plates are disposed to surround all the batteries. Existing end plate is structured as a single component. Both the end plate and the side plate are made of aluminum. The end plate and the side plate are fixedly mounted through welding. With an increasing capacity of battery module, the battery may expand in some cases and thus exert expansion forces on the end plates and the side plates. This will render the end plates and the side plates liable to deformation and displacement, which will cause failure of welding seams between the side plates and the end plates. Therefore, there is a problem of low structural strength in traditional battery modules.

SUMMARY

According to embodiments of the disclosure, there is provided a composite end plate and a battery module. The composite end plate comprises the base plate and the rigid insert made of different materials. The rigid insert can form a connection having a higher strength with the external structural component such that a battery module comprising the composite end plate has a high overall structural strength.

In one aspect, the disclosure provides a composite end plate for a battery module comprising: a base plate comprising a first surface and a second surface disposed opposite to each other, wherein the base plate is arranged such that the first surface faces a battery; and a rigid insert, wherein the rigid insert and the base plate are made of different materials, the rigid insert is made of metal material, the rigid insert is arranged at a bottom portion of the base plate, and at least a part of the rigid insert is arranged at the second surface and extends in a length direction of the second surface.

According to an aspect of embodiments of the disclosure, the rigid insert and the base plate are integrally formed.

According to an aspect of embodiments of the disclosure, the rigid insert and the base plate are separately formed.

According to an aspect of embodiments of the disclosure, the rigid insert comprises a first connecting plate and a second connecting plate intersecting with each other, the rigid insert is connected to the base plate through at least the first connecting plate, and the second connecting plate is arranged at the second surface and extends in the length direction.

According to an aspect of embodiments of the disclosure, the bottom portion of the base plate comprises a first receiving groove and a second receiving groove communicating with each other, the first connecting plate is inserted into the first receiving groove such that the rigid insert is fixed to the base plate, and the second connecting plate is accommodated in the second receiving groove.

According to an aspect of embodiments of the disclosure, a surface of the second connecting plate away from the second receiving groove is flush with the second surface.

According to an aspect of embodiments of the disclosure, both the first receiving groove and the second receiving groove are disposed in the second surface, and the first receiving groove communicates with a side of the second receiving groove away from the bottom portion.

According to an aspect of embodiments of the disclosure, the base plate comprises a trapezoidal portion which is arranged above the first receiving groove and the second receiving groove, wherein along the length direction, the trapezoidal portion is structured at the second surface to protrude at its central segment and depress at its lateral ends.

According to an aspect of embodiments of the disclosure, the base plate further comprises two connecting ends disposed opposite to each other in the length direction, wherein at least one of the two connecting ends comprises a through hole extending from a top portion of the base plate to the bottom portion and a cylinder disposed in the through hole, the cylinder and the base plate are made of different materials, and the cylinder is made of metal material.

According to an aspect of embodiments of the disclosure, a top surface of the base plate is connected to the second surface through an arced surface.

According to embodiments of the disclosure, the composite end plate comprises the base plate and the rigid insert made of different materials. The base plate has a predetermined length, width and thickness. The base plate is a main body of the composite end plate. The rigid insert is connected to the base plate. The rigid insert of the composite end plate can be fixedly connected to an external structural component. The rigid insert can form a connection having a higher strength with the external structural component. When the composite end plate and the external structural component have a connection strength meeting the requirements, the base plate can have a density lower than that of the rigid connecting plate. Therefore, it is possible to reduce the weight of the composite end plate and improve the energy density of the battery module. Furthermore, the material of the base plate can be selected in a wide range.

In another aspect, the disclosure provides a battery module comprising two above composite end plates and a plurality of batteries arranged between the two composite end plates.

According to an aspect of embodiments of the disclosure, the battery module further comprises a pulling component, which comprises a first connecting segment and a second connecting segment disposed opposite to each other and an intermediate segment for connecting the first connecting segment and the second connecting segment, wherein the first connecting segment and the second connecting segment are fixedly connected to the rigid inserts of the two composite end plates respectively, wherein the battery comprises a top cover and the intermediate segment is disposed facing the top cover.

According to an aspect of embodiments of the disclosure, the battery comprises a vent disposed at the top cover, and the intermediate segment comprises a clearance hole disposed corresponding to the vent.

According to an aspect of embodiments of the disclosure, the top cover comprises an annular protrusion, wherein the vent is disposed in an inner hole of the protrusion, and the protrusion inserts into the clearance hole to connect with the intermediate segment.

According to an aspect of embodiments of the disclosure, the battery module further comprises a connecting component, which comprises two opposite free ends and an intermediate portion, wherein the two free ends are fixedly connected to the rigid inserts of the two composite end plates respectively, the battery comprises a housing, and the intermediate portion is disposed corresponding to the housing.

BRIEF DESCRIPTION OF THE DRAWINGS

Features, advantages, and technical effects of exemplary embodiments of the present disclosure will be described below with reference to accompanying drawings.

Figure 1:
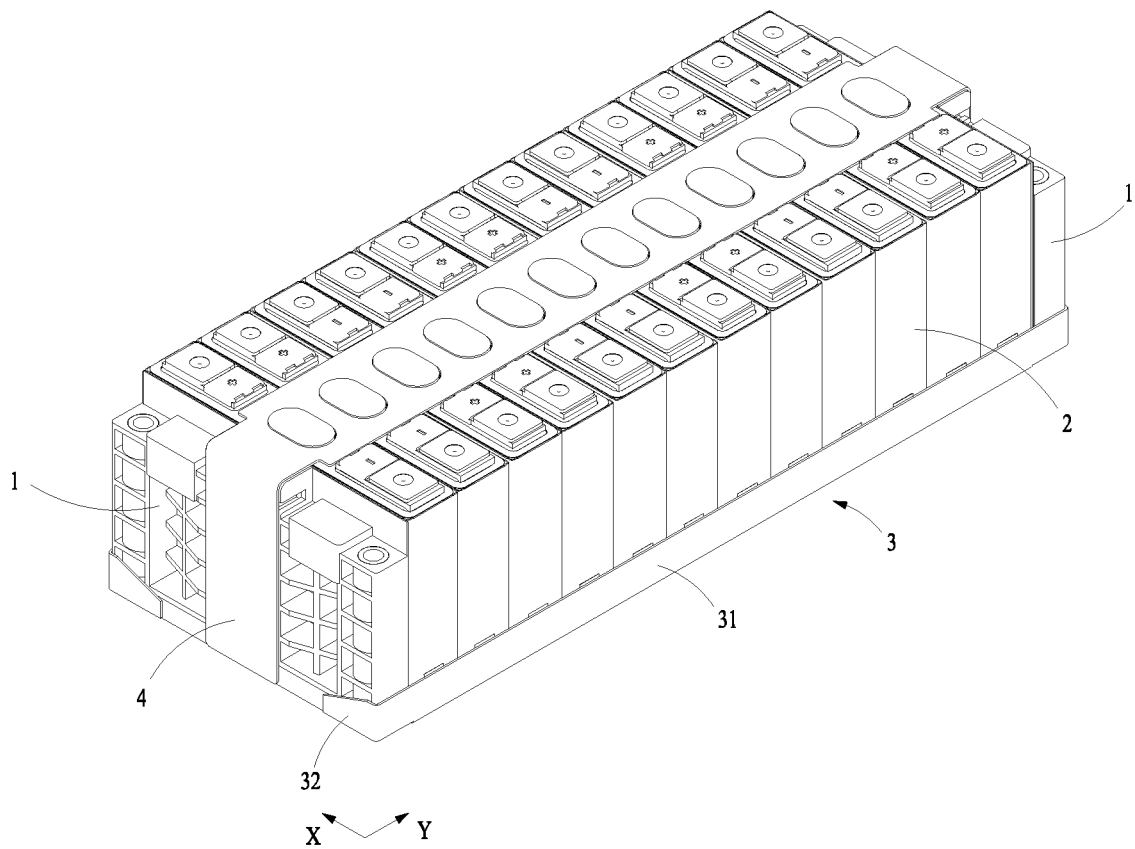
FIG. 1 is a structural schematic diagram of a battery module according to an embodiment of the disclosure.

The views are not necessarily plotted in actual proportion in the drawings.

REFERENCE SIGNS IN THE DRAWINGS 1 composite end plate;
11 base plate;
111 first surface;
112 second surface;
11a top portion;
11b bottom portion;
11c trapezoidal portion;
113 first receiving groove;
114 second receiving groove;
115 connecting end;
115a through hole;
115b cylinder;
116 arced surface;
12 rigid insert;
12a first connecting plate;
12b second connecting plate;
2 battery;
2a top cover;
20 protrusion;
21 vent;
3 connecting component;
31 intermediate portion;
31a first folded segment;
31b second folded segment;
32 free end;
4 pulling component;
41 first connecting segment;
42 intermediate segment;
42a clearance hole;
43 second connecting segment;
X length direction;
Y thickness direction;
F1 expansion force;
F2 tightening force.

DETAILED DESCRIPTION

Below, embodiments of the present disclosure will be further described in detail with reference to the drawings and embodiments. The detailed description according to the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding of the disclosure, a composite end plate 1 according to embodiments of the disclosure will be described below in detail with reference to FIGS. 1 to 7.

Figure 2:
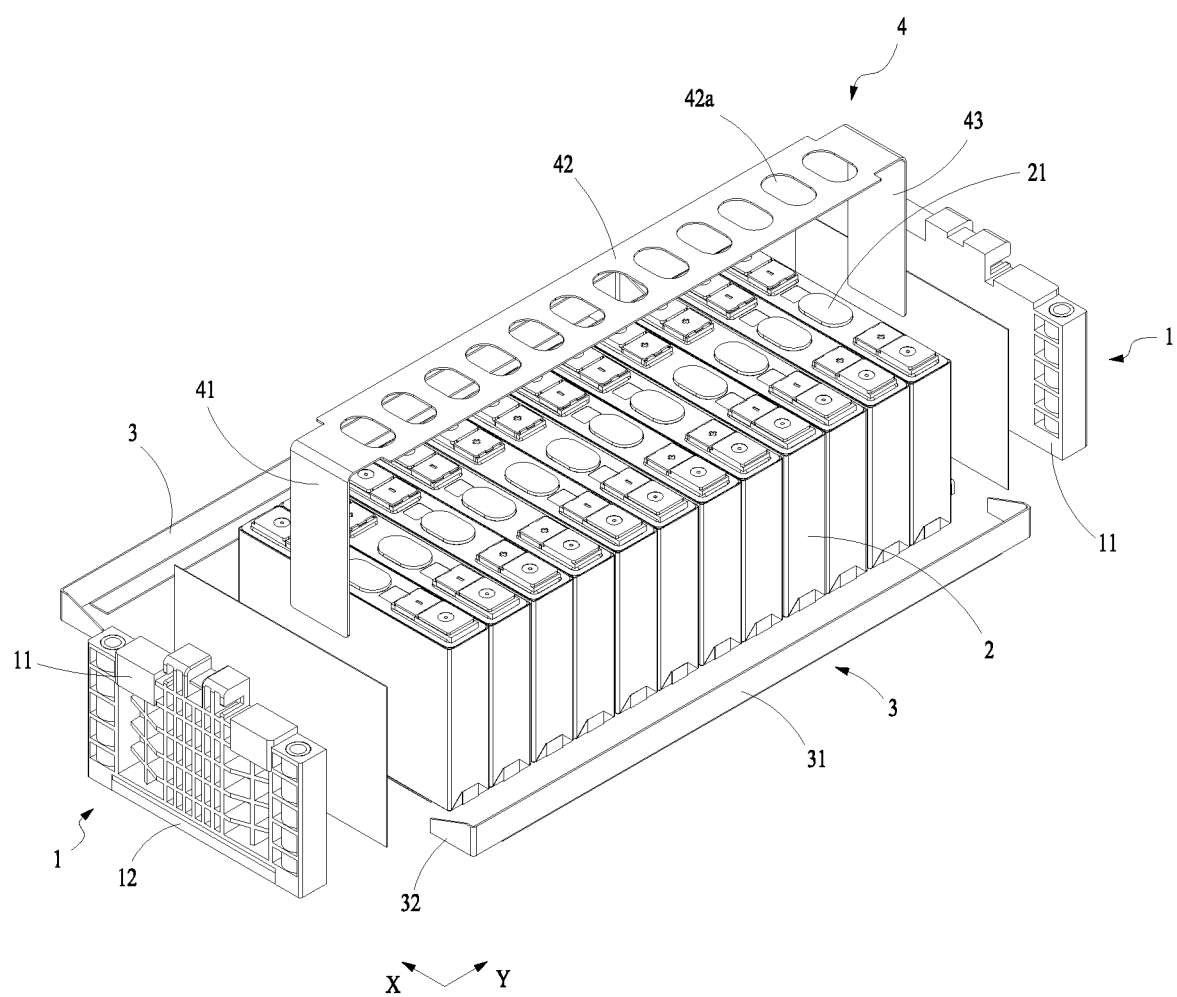
FIG. 2 is an exploded structural view of a battery module according to an embodiment of the disclosure.
Figure 3:
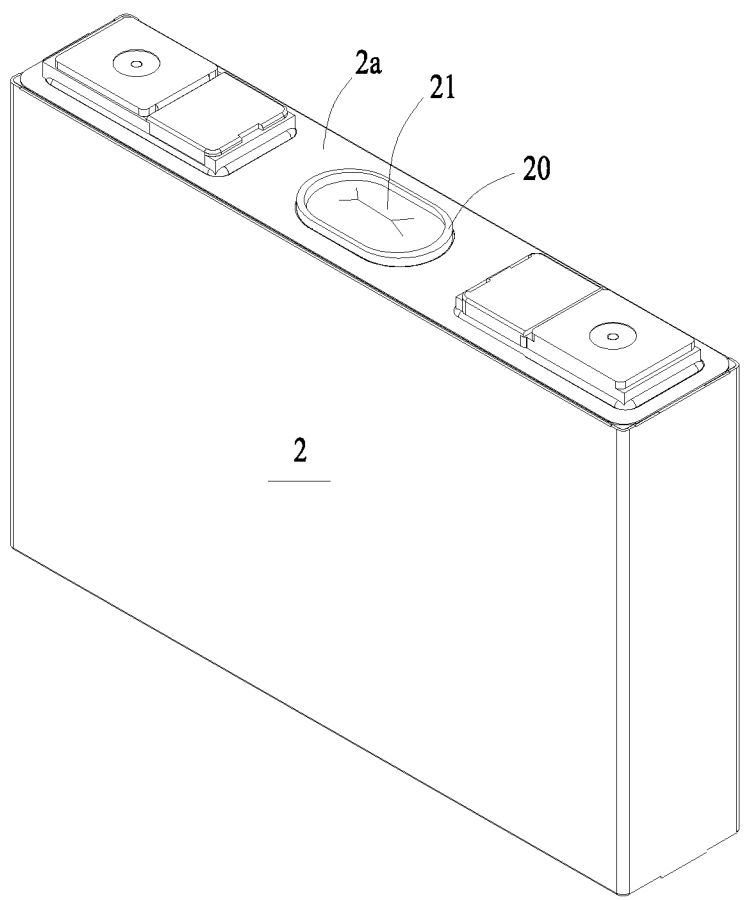
FIG. 3 is a structural schematic diagram of a battery according to an embodiment of the disclosure.
Figure 4:
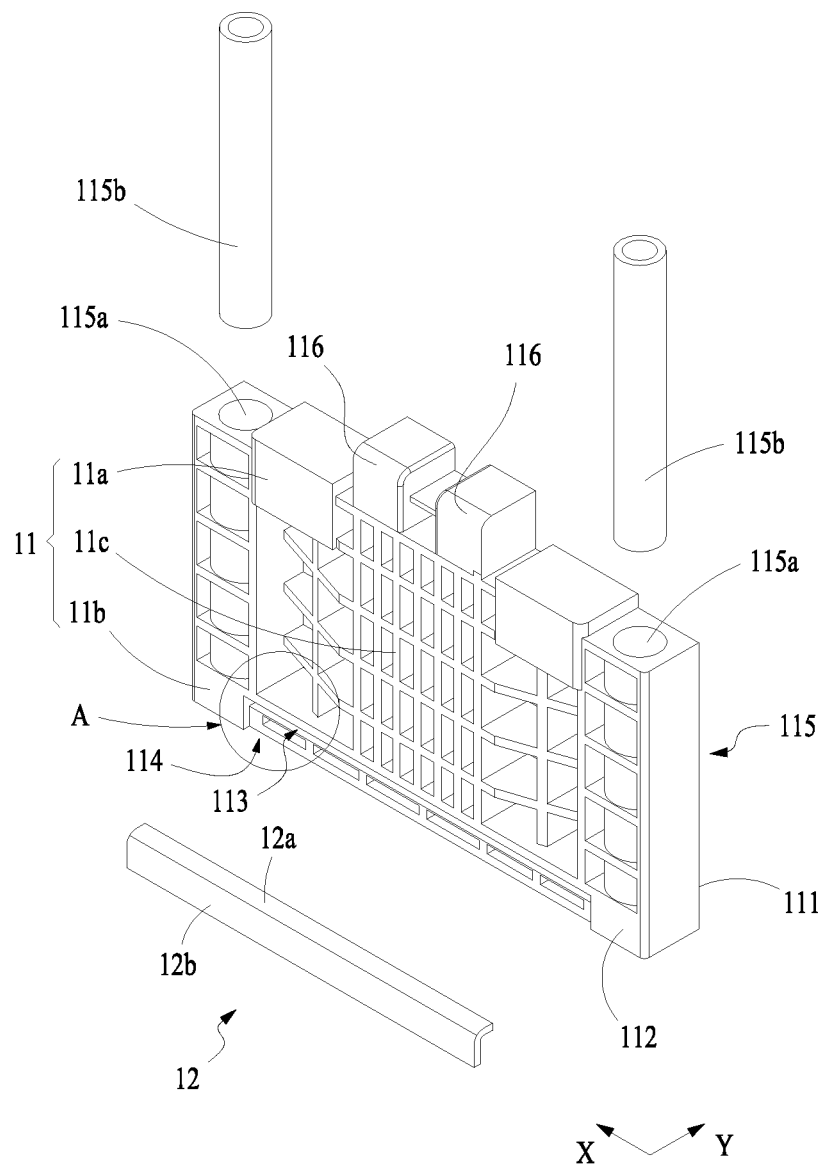
FIG. 4 is a structural schematic diagram of a composite end plate according to an embodiment of the disclosure.
Figure 5:
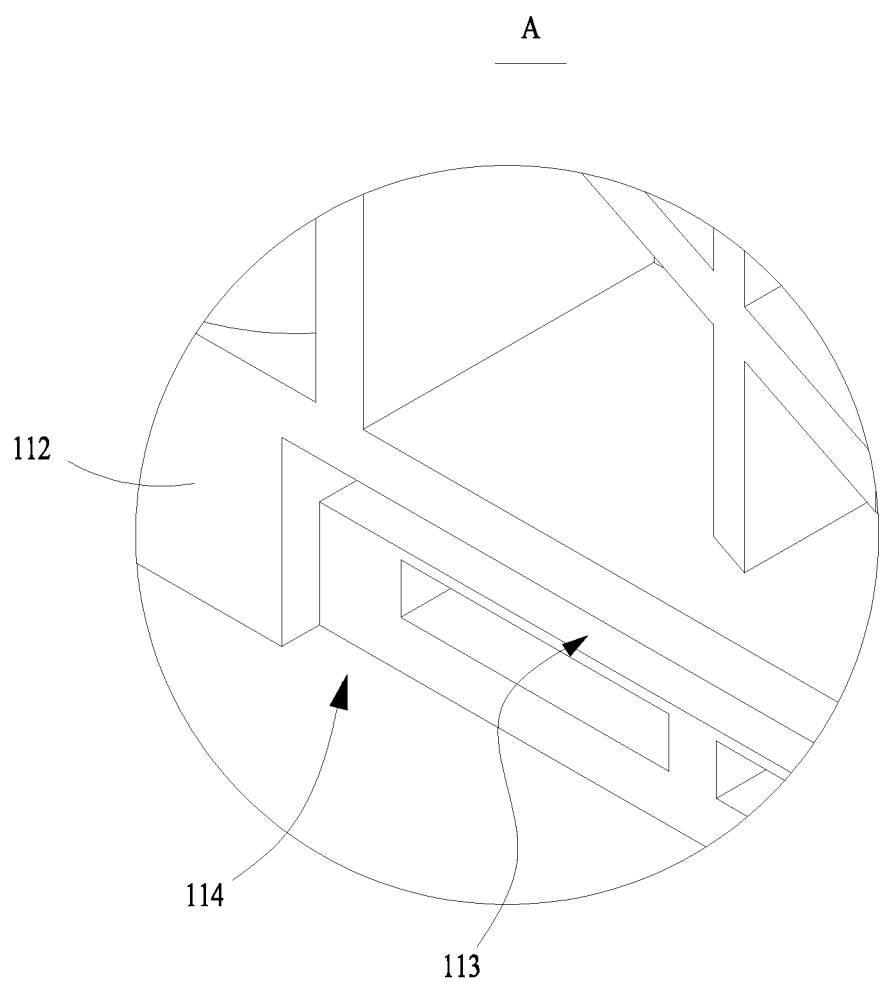
FIG. 5 is an enlarged partial view of a portion A in FIG. 4.
Figure 6:
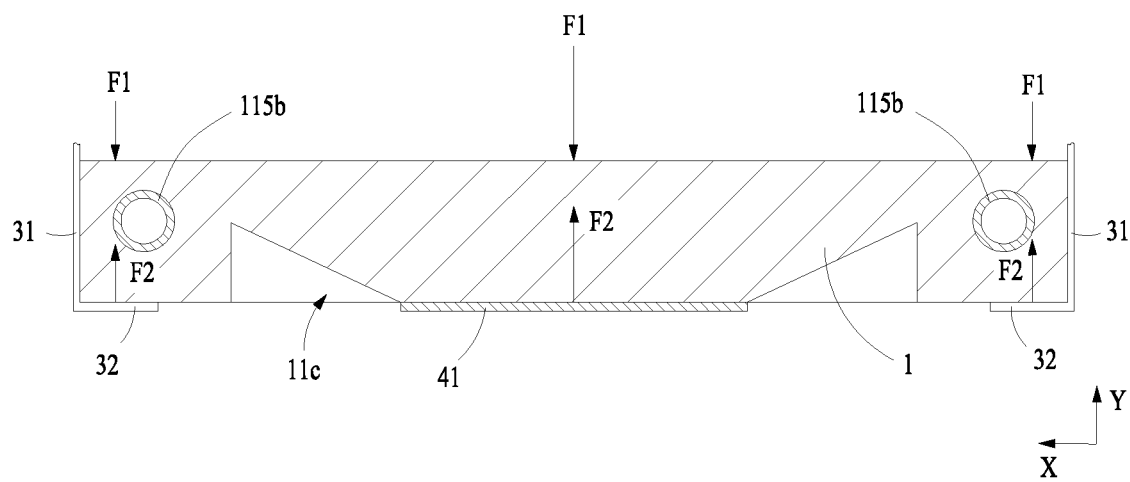
FIG. 6 is a schematic force diagram of a composite end plate according to an embodiment of the disclosure.
Figure 7:
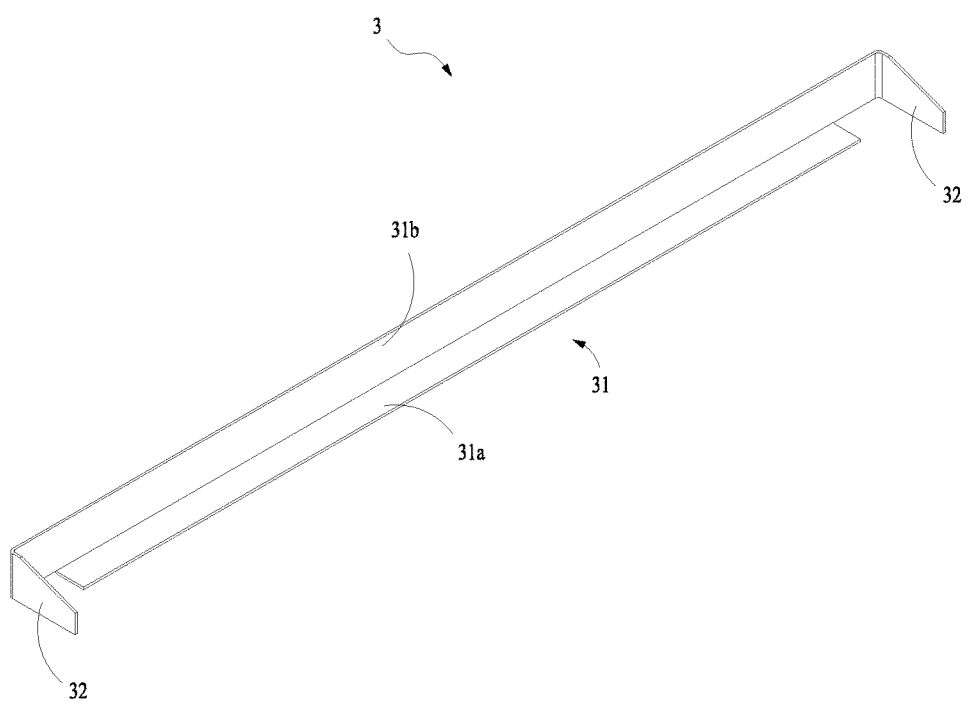
FIG. 7 is a structural schematic diagram of a connecting component according to an embodiment of the disclosure.

FIG. 1 and FIG. 2 schematically show an overall structure of a battery module according to an embodiment of the disclosure. FIG. 3 schematically shows a structure of a battery according to an embodiment of the disclosure. FIG. 4 and FIG. 5 schematically show a structure of a composite end plate 1 according to an embodiment of the disclosure. FIG. 6 schematically shows a force state of a composite end plate 1. FIG. 7 schematically shows a structure of a connecting member 3 according to an embodiment of the disclosure.

As shown in FIG. 1 and FIG. 2, the composite end plate 1 according to embodiments of the disclosure is applied in a battery module. The battery module according to the embodiment comprises a plurality of batteries 2 arranged along a direction, two composite end plates 1 according to embodiments of the disclosure, two connecting components 3 and a pulling component 4. The batteries 2 form a battery assembly. The two composite end plates 1 are disposed at two opposite sides of the battery assembly in the arrangement direction of the batteries 2. The two connecting components 3 are spaced apart in a direction perpendicular to the arrangement direction of the batteries 2, and are connected to the two composite end plates 1, respectively. The pulling component 4 extends in the arrangement direction of the batteries 2. A part of the pulling component 4 is disposed facing a top of the battery assembly. The pulling component 4 comprises two opposite ends and an intermediate portion. One of the two ends is fixedly connected to one of the composite end plates 1, and the other of the two ends is fixedly connected to the other composite end plate 1. The pulling component 4 can tighten the two composite end plates 1 such that the two composite end plates 1 compress the batteries 2. The two composite end plates 1, the two connecting components 3 and the pulling component 4 together form a fixing frame for fixing the battery assembly.

When at least one battery 2 of the batteries 2 expands and deforms, the expanded battery 2 will exert an expansion force F1 (as shown in FIG. 6). The expansion force F1 will be transferred to the fixing frame. Since the pulling component 4 and the connecting component 3 simultaneously exert tightening forces F2 on the composite end plate 1 toward the battery 2 (as shown in FIG. 6) and the direction of the tightening force F2 is opposite to that of the expansion force F1, the tightening forces F2 can counteract a substantial part of the expansion force F1 and thus prevent the composite end plate 1 from moving or deforming in a direction away from the battery 2. Thereby, it is avoided that the connection between the composite end plate 1 and the connecting component 3 is subject to excessive stress and thus breaks. As such, the pulling component 4 can improve the overall structural reliability of the battery module such that the composite end plate 1 can bear larger expansion force F1 from the batteries 2. It is ensured that the connection between the composite end plate 1 and the connecting component 3 is stable and reliable. Also, it is avoided that the overall dimension of the battery module changes.

As shown in FIG. 4 and FIG. 5, the composite end plate 1 according to embodiments of the disclosure comprises a base plate 11. The base plate 11 comprises a first surface 111 and a second surface 112 disposed opposite to each other. In use, the first surface 111 of the base plate 11 faces the battery 2, and the second surface 112 faces external environment. The base plate 11 according to embodiments of the disclosure has a predetermined length and thickness. A thickness direction Y of the base plate 11 is identical to an arrangement direction of the batteries 2, and a length direction X of the base plate 11 is perpendicular to the arrangement direction of the batteries 2. The base plate 11 further comprises a plurality of lightening grids which are inward depressed and extend from the second surface 112 to the first surface 111 such that an overall weight of the composite end plate 1 can be reduced.

The composite end plate 1 according to embodiments of the disclosure further comprises a rigid insert 12. The rigid insert 12 and the base plate 11 are made of different materials. The rigid insert 12 is made of metal material. Two connecting components 3 are space from each other in the length direction X of the base plate 11. The rigid insert 12, the connecting component 3 and the pulling component 4 are made of same material. Since the base plate 11 bears mainly pulling forces from the connecting component 3 and the pulling component 4 and expansion forces from the batteries 2, the material of the base plate 11 can be flexibly selected. When the rigid insert 12, the connecting component 3 and the pulling component 4, which are made of an identical metal material, have a connection stiffness meeting the requirements, the base plate 11 can have a density lower than that of the rigid insert 12. In an embodiment, the rigid insert 12 is made of steel, and the connecting component 3 and the pulling component 4 are also made of steel, such that welding seams between the rigid insert 12 and the connecting component 3 and between the rigid insert 12 and pulling component 4 formed in the welding process have high seam strengths and can bear larger expansion forces resulted from the expansion of the battery 2. Optionally, the rigid insert 12, the connecting component 3 and the pulling component 4 are made of stainless steel, which provides high connection strength and good corrosion resistance. The base plate 11 can be made of engineering plastics, glass fiber reinforced plastics or carbon fibers. Thus, it is possible to reduce an overall weight of the composite end plate 1. Furthermore, the thickness of the base plate 11 can be flexibly selected according to practical requirements. In another embodiment, the base plate 11 can be made of aluminum or aluminum alloy, which can be processed and machined in an extrusion molding process and a machining process. Such manufacturing process has low technical difficulty and low cost.

The rigid insert 12 according to the embodiment is disposed at a bottom portion 11*b* of the base plate 11. At least a part of the rigid insert 12 is arranged at the second surface 112 and extends in a length direction X of the second surface 112. At least a part of the rigid insert 12 is disposed at the second surface 112 and extends in the length direction X of the second surface 112. The connecting component 3 and the pulling component 4 can be fixedly connected to the part of the rigid insert 12 at the second surface 112.

Optionally, as shown in FIG. 7, each connecting component 3 comprises two opposite free end 32 and an intermediate portion 31. A free end 32 of each connecting component 3 is fixedly connected to a rigid insert 12 of one composite end plate 1, and the other free end 32 is fixedly connected to a rigid insert 12 of the other composite end plate 1. The battery 2 comprises a housing and a top cover. The intermediate portion 31 of the connecting component 3 is disposed corresponding to the housing. In an embodiment, the free end 32 of the connecting component 3 and the rigid insert 12 can be fixedly connected through welding process. Thus, both of the two connecting components 3 are spaced apart from the pulling component 4. Therefore, tightening forces F2 can be applied to the two composite end plates 1 at three different locations, such that it is possible to prevent the location or the structure of the composite end plate 1 from being changed due to the expansion forces F1 exerted on the composite end plate 1.

Furthermore, the intermediate portion 31 of each connecting component 3 comprises a first folded segment 31*a* and a second folded segment 31*b* intersecting with each other. The first folded segment 31*a* of the connecting component 3 extends to a bottom portion of the battery 2 to support the battery 2. Thus, the first folded segment 31*a* and the pulling component 4 limit each battery 2 together to prevent the battery 2 from moving in a vertical direction. The second folded segment 31*b* of the connecting component 3 extends toward a top portion of the battery 2 and contacts with a side portion of the battery 2. Thus, the two connecting components 3 can limit the battery 2 together to prevent the battery 2 from moving in its width direction. Accordingly, it is not necessary to provide binder such as glue between adjacent batteries 2, thus it is possible to reduce assembly difficulty of the batteries 2 and reduce an overall dimension of the assembled batteries 2.

Furthermore, the battery module can omit side plates in prior art for covering entire side of the battery 2. As such, when the connecting component 3 limits the batteries 2, it is possible to reduce its own weight and thus an overall weight of the battery module. Furthermore, more area of the bottom and side portion of the battery 2 can be exposed, and thus a better heat dissipation effect is obtained.

Optionally, an extending dimension of the first folded segment 31a is one eighth to one third of a width of the battery 2. An extending dimension of the second folded segment 31b is one eighth to one third of a height of the battery 2.

In an embodiment, the two free ends 32 of the connecting component 3 are bent to a same side such that the connecting component 3 has a U-shaped structure. A free end 32 of the connecting component 3 is connected to a rigid insert 12 disposed at a bottom portion 11b of one base plate 11, and the other free end 32 is connected to a rigid insert 12 disposed at a bottom portion 11b of the other base plate 11. Accordingly, the two free ends 32 of the connecting component 3 can apply tightening forces F2 to the composite end plates 1 from the second surfaces 112 of the base plates 11, respectively. As such, it is avoided that the bottom of the composite end plate 1 has a larger movement than its top and thus tilts due to the expansion forces F1.

As shown in FIG. 2, the pulling component 4 according to the embodiment comprises a first connecting segment 41, an intermediate segment 42 and a second connecting segment 43. The battery module comprises two composite end plates 1 and a plurality of batteries 2 arranged between the two composite end plates 1. The pulling component 4 is fixedly connected to a rigid insert 12 of one composite end plate 1 through the first connecting segment 41, and fixedly connected to a rigid insert 12 of the other composite end plate 1 through the intermediate segment 42. The first connecting segment 41 and the intermediate segment 42 extend to a same side of the intermediate segment 42 such that the pulling component 4 has a U-shaped structure. In the embodiment, the first connecting segment 41 and the second connecting segment 43 have the same structure. The first connecting segment 41 and the second connecting segment 43 extend to the bottoms of the composite end plates 1 for a same length, respectively. The first connecting segment 41 and the second connecting segment 43 have a same extending dimension in a direction perpendicular to the arrangement direction of the batteries 2. In an embodiment, the battery 2 is a square battery. The above direction perpendicular to the arrangement direction of the batteries 2 is a width direction of the battery 2. As such, the extending dimensions of the first connecting segment 41 and the second connecting segment 43 are their widths.

Since the first connecting segment 41 and the second connecting segment 43 have the same structure, the first connecting segment 41 and the second connecting segment 43 are disposed opposite to each other in the arrangement direction of the batteries 2. Accordingly, a force exerted on one composite end plate 1 by the first connecting segment 41 is contrary to a force exerted on the other composite end plate 1 by the intermediate segment 42, such that there are more uniform stress states in the two composite end plates 1. As such, when the battery 2 expands, it is possible to maintain the locations of the two composite end plates 1 unchanged or keep the deformations of the composite end plates 1 very small. Thus, it is possible to improve overall structural reliability of the battery module, and keep the overall dimension of the battery module unchanged or ensure the change of the overall dimension very small.

According to the embodiment, a surface of the first connecting segment 41 away from the composite end plate 1 can be flush with the second surface 112 of the base plate 11. A surface of the second connecting segment 43 away from the composite end plate 1 can be flush with the second surface 112 of the base plate 11. As such, the first connecting segment 41 and the second connecting segment 43 of the pulling component 4 will not increase the overall dimension of the battery module, and ensure a compact overall structure of the battery module.

In an embodiment, the pulling component 4 is in a plate shape and has a predetermined thickness and width. A surface of the pulling component 4 extending along its width is disposed facing the second surface 112. The pulling component 4 is made of metal material, such as steel, iron and the like.

In an embodiment, the battery 2 comprises a housing and a top cover 2a hermetically connected to the housing. The battery 2 further comprises a vent 21 disposed at the top cover 2a. The intermediate segment 42 of the pulling component 4 is disposed above the vent 21, and comprises a clearance hole 42a disposed corresponding to the vent 21. As such, in one side, it is avoided the position of the intermediate segment 42 interferes the normal operation of the vent 21. In another aspect, a surface of the pulling component 4 facing the battery 2 can contact with the surface of the top cover 2a. Therefore, the assembling of the pulling component 4 and the battery 2 provides a compact structure and reduces the impact of the pulling component 4 on the overall dimension of the battery module. In another aspect, the intermediate segment 42 can limit each battery 2 to prevent the battery 2 from moving in a vertical direction.

In another embodiment, as shown in FIG. 3, the top cover 2a comprises an annular protrusion 20. The top cover 2a comprises a through hole in the protrusion 20. The vent 21 is disposed at an inner hole of the annular protrusion 20. The intermediate segment 42 of the pulling component 4 comprises a clearance hole 42a disposed corresponding to the vent 21. The protrusion 20 inserts into the clearance hole to connect with the intermediate segment. The protrusion 20 forms an interference fit with the clearance hole. As such, in one side, it is avoided the position of the intermediate segment 42 interferes the normal operation of the vent 21. In another aspect, since the protrusion 20 of the top cover 2a inserts into the clearance hole 42a, the surface of the pulling component 4 facing the battery 2 can directly contact with the surface of the top cover 2a. Therefore, the assembling of the pulling component 4 and the battery 2 provides a compact structure and reduces the impact of the pulling component 4 on the overall dimension of the battery module. Furthermore, when the protrusion 20 of the top cover 2a inserts into the clearance hole 42a, the intermediate segment 42 can limit each battery 2 through the protrusions 20, and thereby it is avoided that the batteries 2 moves in the arrangement direction. In another aspect, when the pulling component 4 is being mounted, the clearance hole 42a of the intermediate segment 42 surrounds the protrusion 20 such that the pulling component 4 and the top cover 2a can be quickly and correctly positioned and thus the assembling efficiency and accuracy can be improved.

In an embodiment, the rigid insert 12 and the base plate 11 according to the embodiment can be integrally formed. In an exemplary embodiment, the base plate 11 is made of engineering plastics. The rigid insert 12 is made of steel. The base plate 11 and the rigid insert 12 can be integrally formed through injection molding. The integrally formed base plate 11 and rigid insert 12 have high connection strength. As such, on one side, the base plate 11 and the rigid insert 12 will not separate from each other when being subject to external impact forces. On the other side, there is no gap between the base plate 11 and the rigid insert 12. Accordingly, when any of the base plate 11 and the rigid insert 12 is subject to an external force, they will simultaneously deform or move. Therefore, it is possible to avoid a case in which the base plate 11 and the rigid insert 12 have asynchronous stress states or non-uniform stress states due to a gap between the base plate 11 and the rigid insert 12. In such case, the base plate 11 and the rigid insert 12 will wear due to friction in long-term use, and thus the rigid insert 12 gets loose from the base plate 11 and fails to operate. Furthermore, through injection molding process, fewer procedures are required to form the base plate 11 and the rigid insert 12, and thus the manufacturing efficiency is improved.

The rigid insert 12 according to the embodiment comprises a first connecting plate 12a and a second connecting plate 12b intersecting with each other. The rigid insert 12 is connected to the base plate 11 through at least the first connecting plate 12a. The second connecting plate 12b is arranged at the second surface 112 and extends in the length direction X of the base plate 11. Through injection molding process, the first connecting plate 12a or a part of the first connecting plate 12a and the second connecting plate 12b is pre-embedded in the base plate 11. A surface of the second connecting plate 12b away from the base plate 11 protrudes beyond the second surface 112 or is flush with the second surface 112. The surface of the second connecting plate 12b away from the base plate 11 or the second connecting plate 12b can be fixedly connected with an external structural component.

In an embodiment, as shown in FIG. 4 and FIG. 5, the rigid insert 12 and the base plate 11 according to the embodiment are separately formed. Then base plate 11 and the rigid insert 12 are separately manufactured and then assembled together. On one side, it is beneficial to the detachment and attachment of the base plate 11 and the rigid insert 12 when the rigid insert 12 or the base plate 11 is being changed or maintained. On the other side, the material of the base plate 11 can be flexibly selected. The base plate 11 can be made of lightweight material, such as engineering plastics, glass fiber reinforced plastics, carbon fibers, aluminum or aluminum alloy and the like. The rigid insert 12 can be made of steel, preferably stainless steel.

The rigid insert 12 according to the embodiment comprises a first connecting plate 12a and a second connecting plate 12b intersecting with each other. The rigid insert 12 can be connected to the base plate 11 through the first connecting plate 12a. In this case, the first connecting plate 12a can be fixedly connected to the base plate 11 through screw or rivet. Alternatively, the rigid insert 12 can be connected to the base plate 11 through the first connecting plate 12a and the second connecting plate 12b. In this case, both the first connecting plate 12a and the second connecting plate 12b can be fixedly connected to the base plate 11 through screw or rivet, thus the connection strength of the rigid insert 12 and the base plate 11 is improved. The second connecting plate 12b according to the embodiment is arranged at the second surface 112 and extends in the length direction X. A surface of the second connecting plate 12b away from the base plate 11 protrudes beyond the second surface 112 or is flush with the second surface 112. Preferably, the surface of the second connecting plate 12b away from the base plate 11 is flush with the second surface 112 of the base plate 11. Therefore, the overall thickness of the composite end plate 1 is reduced, and the overall dimension of the battery module is further reduced.

Optionally, each of the first connecting plate 12a and the second connecting plate 12b is a solid plate in an overall flat and straight shape. Alternatively, the first connecting plate 12a and the second connecting plate 12b can be hollowed out plate. Alternatively, the first connecting plate 12a can have a serrated shape, and the second connecting plate 12b is a solid plate or a hollowed out plate in an overall flat and straight shape.

According to the embodiment, the bottom portion 11b of the base plate 11 comprises a first receiving groove 113 and a second receiving groove 114 communicating with each other and having different depths. The first connecting plate 12a inserts into the first receiving groove 113 such that the rigid insert 12 is fixed to the base plate 11. The second connecting plate 12b is accommodated in the second receiving groove 114.

Optionally, a first receiving groove 113 is disposed at a bottom surface of the base plate 11 and extending along its thickness direction Y, and a second receiving groove 114 is disposed at the second surface 112 of the base plate 11. The first receiving groove 113 and the second receiving groove 114 communicate with each other. A depth of the first receiving groove 113 in the thickness direction Y is larger than that of the second receiving groove 114, or smaller than that of the second receiving groove 114.

Optionally, with respect to the second receiving groove 114, the first receiving groove 113 can be positioned in a central region of the second receiving groove 114, and both the first receiving groove 113 and the second receiving groove 114 extend along the length direction X of the base plate 11. Thus, the first receiving groove 113 and the second receiving groove 114 form a stepped countersink structure. Accordingly, the first connecting plate 12a and the second connecting plate 12b of the rigid insert 12 according to the embodiment intersect with each other such that the rigid insert 12 has a T-shaped structure in its cross-section.

Optionally, both the first receiving groove 113 and the second receiving groove 114 are disposed in the second surface 112 of the base plate 11. The first receiving groove 113 can be closer to the bottom surface of the base plate 11 than the second receiving groove 114. Alternatively, the first receiving groove 113 can be farther from the bottom surface of the base plate 11 than the second receiving groove 114. A depth of the first receiving groove 113 in the thickness direction Y of the base plate 11 is larger than that of the second receiving groove 114 in the thickness direction of the base plate 11. Accordingly, the first connecting plate 12a and the second connecting plate 12b of the rigid insert 12 according to the embodiment intersect with each other. Preferably, the first connecting plate 12a and the second connecting plate 12b are perpendicular to each other such that the rigid insert 12 has a L-shaped structure in its cross-section.

The first connecting plate 12a of the rigid insert 12 according to the embodiment inserts into the first receiving groove 113. The first connecting plate 12a can form an interference fit with the first receiving groove 113, or can be attached to at least a part of the rigid insert 12 through binder and sunk in the second receiving groove 114. Preferably, a surface of the second connecting plate 12b away from the second receiving groove 114 is flush with the second surface 112 of the base plate 11. Thereby, the overall thickness of the composite end plate 1 is reduced and the overall dimension of the battery module is further reduced. When the battery 2 expands and applies an expansion force F1 on the composite end plate 1, the pulling component 4 fixedly connected to the second connecting plate 12b of the rigid insert 12 will exert a tightening force on the composite end plate 1. Due to the effect of the pulling component 4, the rigid insert 12 shows a trend of overturning toward a top portion 11a of the base plate 11. However, since the first connecting plate 12a inserts in the first receiving groove 113 of the base plate 11 and the first connecting plate 12a is connected to an edge of the second connecting plate 12b away from a bottom portion 11b of the base plate 11, the first connecting plate 12a can effectively resist a torque of the rigid insert 12 and prevent the rigid insert 12 from overturning.

According to the embodiment, a trapezoidal portion 11c is arranged between the first surface 11a and the bottom portion 11b of the base plate 11. The trapezoidal portion 11c is disposed above the first receiving groove 113 and the second receiving groove 114. As such, the base plate 11 comprises a top portion 11a, a trapezoidal portion 11c at the middle and a bottom portion 11b. The first surface 111 of the base plate 11 has a flat region corresponding to the trapezoidal portion 11c. Two depressed regions of the trapezoidal portion 11c at its lateral sides extend from the second surface 112 toward the first surface 111. The two depressed regions of the trapezoidal portion 11c at its lateral sides are spaced apart in the length direction X of the base plate 11. The pulling component 4 extends beyond the central region of the trapezoidal portion 11c and then is fixedly connected to the rigid insert 12 at the bottom portion 11b of the base plate 11. As such, when the pulling component 4 exerts the tightening force on the composite end plate 1, the tightening force acts mainly in the central region of the trapezoidal portion 11c. The central region of the trapezoidal portion 11c is more prone to deform than the other regions of the base plate 11. Therefore, when the central region of the trapezoidal portion 11c is subject to the tightening force, the central region of the trapezoidal portion 11c has a larger deformation toward the battery 2 than other regions of the base plate 11, and thus is more likely to apply a resistive force on the battery 2 to counteract the expansion force F1. Preferably, the trapezoidal portion 11c as a whole has a shape of isosceles trapezoid in its cross-section and has more uniform stress state.

The base plate 11 according to the embodiment further comprises two connecting ends 115 disposed opposite to each other in the length direction X. At least one of the two connecting ends 115 comprises a through hole 115a extending from the top portion 11a of the base plate 11 to the bottom portion 11b and a cylinder 115b disposed in the through hole 115a. The cylinder 115b and the base plate 11 are made of different materials, and the cylinder 115b is made of metal material. The battery module comprising the composite end plate 1 according to embodiments of the disclosure can be fixedly connected to an external structural component (such as a case) through the connecting end 115 of the composite end plate 1. In an exemplary embodiment, after the battery module is disposed at a predetermined mounting position, a bolt is used to pass through the connecting end 115 and then threaded to the case such that the fixing operation of battery module is completed. When the base plate 11 according to the embodiment is made of engineering plastics, the connecting end 115 can be made of metal materials, such as steel, aluminum or aluminum alloy and the like. Optionally, the cylinder 115b and the base plate 11 are integrally formed through injection molding. Optionally, the connecting end 115 of the base plate 11 is preheated to a predetermined temperature, and then the cylinder 115b is inserted the through hole 115a with an increased diameter. Then, after the cooling process, the diameter of the through hole 115a will be decreased, and then the connecting end 115 and the cylinder 115b are firmly connected together. Optionally, the through hole 115a is a hole with an internal thread and the cylinder 115b comprises an external thread such that the cylinder 115b is threaded to the through hole 115a.

According to embodiments of the disclosure, a top surface of the base plate 11 is connected to the second surface 112 through an arced surface 116. The arced surface 116 is a transitional surface. Between the first connecting segment and the intermediate segment of the pulling component 4 and between the second connecting segment and the intermediate segment of the pulling component 4, arced transitional segments can be provided to form a form fit with the arced surfaces 116. After the pulling component 4 is fixedly connected to the rigid insert 12 of the composite end plate 1, the arced transitional segment of the pulling component 4 contacts with the arced surface 116 of the base plate 11. As such, on one side, the pulling component 4 transitions gently at the arced surface 116 of the base plate 11. Thereby, the arced surface 116 of the base plate 11 will cause stress concentration in the pulling component 4, and it is avoided that the base plate 11 frequently exerts shear forces on the pulling component 4 to cause breaking of the pulling component 4. On the other side, when the composite end plate 1 is subject to the expansion force F1 due to the expansion and deformation of the battery 2, there will be slight relative movement between the composite end plate 1 and the pulling component 4. Since the composite end plate 1 contacts with the pulling component 4 at the arced surface 116, their relative movement is smooth and their wear is small. It is beneficial to for improving the lift time of the composite end plate 1 and the pulling component 4.

According to embodiments of the disclosure, the composite end plate 1 comprises the base plate 11 and the rigid insert 12 made of different materials. The base plate 11 has a predetermined length, width and thickness. The base plate 11 is a main body of the composite end plate 1. The rigid insert 12 is connected to the base plate 11. The rigid insert 12 of the composite end plate 1 can be fixedly connected to an external structural component. The rigid insert 12 can form a connection having a higher strength with the external structural component. When the composite end plate 1 and the external structural component have a connection strength meeting the requirements, the base plate 11 can have a density lower than that of the rigid connecting plate 12. Therefore, it is possible to reduce the weight of the composite end plate 1 and improve the energy density of the battery module. Furthermore, the material of the base plate can be selected in a wide range.

According to embodiments of the disclosure, a battery module comprises two composite end plates 1, a plurality of batteries 2, a connecting component 3 and a pulling component 4. The two composite end plates 1 are fixedly connected through the connecting component 3 and the pulling component 4 such that a fixing frame for fixing the batteries 2 is formed. The two composite end plates 1 are pulled by the connecting component 3 and the pulling component 4 to tighten the batteries 2. The structural strength of the battery module is improved. Since the two composite end plates 1 are restrained by both the connecting component 3 and the pulling component 4, when the battery 2 expands to exert the expansion force F1, the composite end plate 1 will not move or deform in a direction away from the battery 2 due to the expansion force F1. The safety and stability of the battery module in use can be effectively ensured.

In the above embodiments, the battery 2 can be a square battery. The square battery comprises two larger-area side surfaces and two smaller-area side surfaces. When plural square batteries are arranged, the larger-area side surfaces of the adjacent two square batteries are disposed corresponding to each other.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module, comprising two composite end plates and a plurality of batteries arranged between the two composite end plates, wherein the composite end plate comprises:
    a base plate comprising a first surface and a second surface disposed opposite to each other, wherein the base plate is arranged such that the first surface faces a battery; and
    a rigid insert, wherein the rigid insert and the base plate are made of different materials, the rigid insert is made of metal material, the rigid insert is entirely arranged at a bottom portion of the base plate, and at least a part of the rigid insert is arranged at the second surface and extends in a length direction of the second surface,
    the rigid insert comprises a first connecting plate and a second connecting plate intersecting with each other, the rigid insert is directly connected to the base plate through at least the first connecting plate, and the second connecting plate is arranged at the second surface and extends in the length direction,
    the bottom portion of the base plate comprises a first receiving groove and a second receiving groove communicating with each other, the first connecting plate is inserted into the first receiving groove such that the rigid insert is fixed to the base plate, and the second connecting plate is accommodated in the second receiving groove,
    a pulling component, which comprises a first connecting segment and a second connecting segment disposed opposite to each other and an intermediate segment for connecting the first connecting segment and the second connecting segment, wherein the first connecting segment and the second connecting segment are fixedly connected to the rigid inserts of the two composite end plates respectively.

2. The battery module according to claim 1, wherein the battery comprises a top cover and the intermediate segment is disposed facing the top cover.

3. The battery module ac cording to claim 2, wherein the battery comprises a vent disposed at the top cover, and the intermediate segment comprises a clearance hole disposed corresponding to the vent.

4. The battery module according to claim 3, wherein the top cover comprises an annular protrusion, wherein the vent is disposed in an inner hole of the protrusion, and the protrusion inserts into the clearance hole to connect with the intermediate segment.

5. The battery module according to claim 1, wherein the battery module further comprises a connecting component, which comprises two opposite free ends and an intermediate portion, wherein the two free ends are fixedly connected to the rigid inserts of the two composite end plates respectively, the battery comprises a housing, and the intermediate portion is disposed corresponding to the housing.

6. The battery module according to claim 1, wherein the rigid insert and the base plate are integrally formed.

7. The battery module according to claim 1, wherein the rigid insert and the base plate are separately formed.

8. The battery module according to claim 1, wherein a surface of the second connecting plate away from the second receiving groove is flush with the second surface.

9. The battery module according to claim 1, wherein both the first receiving groove and the second receiving groove are disposed in the second surface, and the first receiving groove communicates with a side of the second receiving groove away from the bottom portion.

10. The battery module according to claim 1, wherein the base plate comprises a trapezoidal portion which is arranged above the first receiving groove and the second receiving groove, wherein along the length direction, the trapezoidal portion is structured at the second surface to protrude at its central segment and depress at its lateral ends.

11. The battery module according to claim 1, wherein the base plate further comprises two connecting ends disposed opposite to each other in the length direction, wherein at least one of the two connecting ends comprises a through hole extending from a top portion of the base plate to the bottom portion and a cylinder disposed in the through hole, the cylinder and the base plate are made of different materials, and the cylinder is made of metal material.

12. The battery module according to claim 1, wherein a top surface of the base plate is connected to the second surface through an arced surface.

13. The battery module according to claim 8, wherein both the first receiving groove and the second receiving groove are disposed in the second surface, and the first receiving groove communicates with a side of the second receiving groove away from the bottom portion.

14. The battery module according to claim 13, wherein the base plate comprises a trapezoidal portion which is arranged above the first receiving groove and the second receiving groove, wherein along the length direction, the trapezoidal portion is structured at the second surface to protrude at its central segment and depress at its lateral ends.

* * * * *